United States Patent [19]

Fowler

[11] 4,047,168

[45] Sept. 6, 1977

[54] DIGITAL COMPASS AND GIMBAL ASSEMBLY FOR TWO CONDUCTOR CONNECTION

[75] Inventor: John T. Fowler, Winthrop, Mass.

[73] Assignee: The Laitram Corporation, Harahan, La.

[21] Appl. No.: 579,973

[22] Filed: May 22, 1975

[51] Int. Cl.$^2$ .............................................. G01C 17/26
[52] U.S. Cl. ..... 340/310 R; 33/363 R; H03K/13/02; 340/210; 340/347 P
[58] Field of Search ................ 340/347 P, 340/310 R, 210; 33/363 K, 363 R, 363 L

[56] References Cited

U.S. PATENT DOCUMENTS

| 215,403 | 5/1879 | Severn | 33/363 L |
|---|---|---|---|
| 2,089,914 | 8/1937 | Freeman | 33/363 L |
| 2,248,889 | 7/1941 | Muller | 33/363 R |
| 2,662,208 | 12/1953 | Wells | 33/363 R X |
| 2,973,413 | 2/1961 | Hill | 33/363 L |
| 3,206,863 | 9/1965 | Hatch | 33/363 L |
| 3,234,543 | 2/1966 | Thompson et al. | 340/210 |
| 3,237,584 | 3/1966 | Keithley | 33/363 L |
| 3,349,406 | 10/1967 | Perry et al. | 33/363 K |
| 3,717,858 | 2/1973 | Hadden | 340/210 X |
| 3,833,901 | 9/1974 | Fowler | 340/347 P |

FOREIGN PATENT DOCUMENTS 5,289 of 1895 United Kingdom .............. 33/363 R

OTHER PUBLICATIONS

Grob, Basic Television, McGraw-Hill Book Co., Inc., 1954, p. 504.

Primary Examiner—Thomas J. Sloyan
Attorney, Agent, or Firm—Weingarten, Maxham & Schurgin

[57] ABSTRACT

A remote reading magnetic compass operative with only two electrical connections for both power and data purposes. The compass includes a disc which is photoelectrically sensed to provide output signals representative of compass heading and is supported by a gimbal assembly including pivots which serve as electrical terminals by which energizing power is supplied to the compass electronics and by which data is read out from the compass.

19 Claims, 9 Drawing Figures

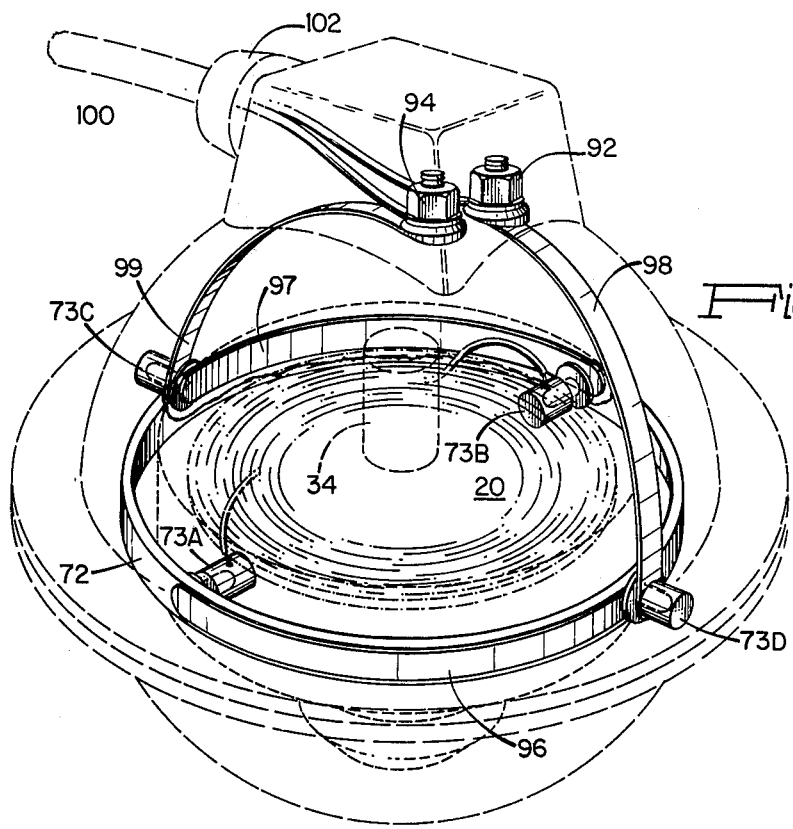
Fig. 2.
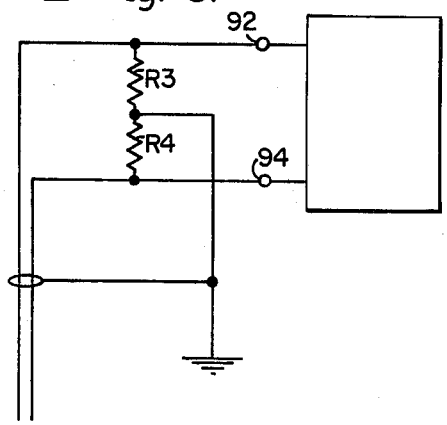
Fig. 6.
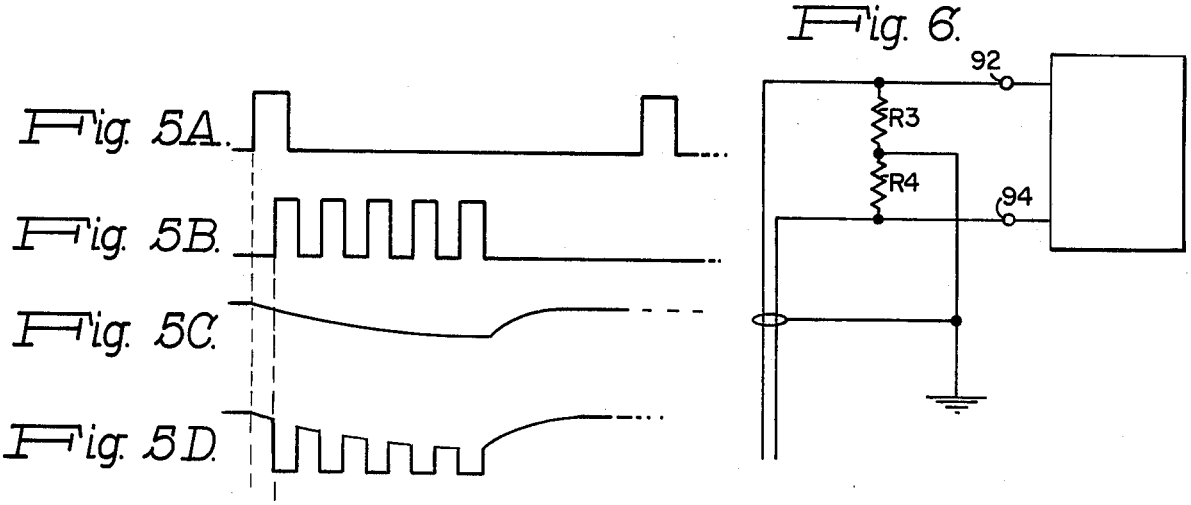
Fig. 5A.
Fig. 5B.
Fig. 5C.
Fig. 5D.
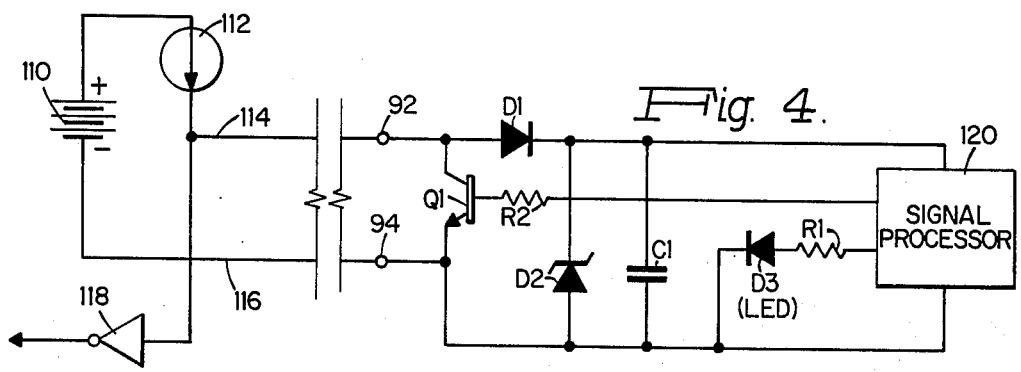
Fig. 4.

1

DIGITAL COMPASS AND GIMBAL ASSEMBLY FOR TWO CONDUCTOR CONNECTION

FIELD OF THE INVENTION

This invention relates to magnetic compasses and more particularly to a remote reading magnetic compass providing electrical signal indications of compass heading.

BACKGROUND OF THE INVENTION

Remote reading magnetic compasses are known wherein electrical signals representative of compass heading are provided for application to display or other utilization apparatus. A particularly effective remote reading compass operative to provide digital output signals is the subject of copending application Ser. No. 279,723, filed Aug. 10, 1972 and U.S. Pat. No. 3,833,901, issued Sept. 3, 1974, both assigned to the assignee of this invention. The compass shown in the aforesaid patent and patent application includes an optically transmissive disc having a plurality of optically coded concentric tracks representing discrete angular disc positions denoting corresponding compass headings. An array of photosensors is arranged in operative association with the coded tracks of the compass disc, the array being illuminated by a light source disposed on the opposite side of the disc from the photosensor array. The array is operative to provide a plurality of digital output signals representative of compass heading as determined by the angular position of the compass disc and which signals can be processed by associated electronic circuitry to provide an intended output signal representation of heading. It is an object of the present invention to provide a remote reading digital compass adapted for implementation in extremely small size and capable of operation with only a minimum number of interconnecting leads.

SUMMARY OF THE INVENTION

Briefly, the present invention provides a remote reading magnetic compass of small efficient size and capable of operation with only two electrical connections for both power and data purposes. The compass includes a disc containing coded tracks which are photoelectrically sensible to provide output signals representative of angular disc position and therefore of compass heading. The compass disc is enclosed within a housing which can be formed by circuit boards containing the associated electronic circuitry for processing the output signals derived from the coded disc. The housing is pendulously supported by a gimbal assembly within an outer housing, both housings being filled with a damping liquid to minimize spurious motion of the compass disc. The gimbal assembly includes pivots which are electrically conductive and which serve as electrical terminals by which energizing power is supplied to the compass electronics and by which data is readout from the compass.

DESCRIPTION OF THE DRAWINGS

The invention will be more fully understood from the following detailed description taken in conjunction with the accompanying drawings, in which:

FIG. 2 is a pictorial view partly in section and partly in phantom of the embodiment of FIG. 1;

FIG. 4 is a schematic representation of electronic circuitry providing two wire operation according to the invention;

FIGS. 5A through 5C are waveform diagrams useful in illustrating operation of the circuit of FIG. 4; and FIG. 6 is a schematic representation of a balanced output network of a type useful with the present invention.

DETAILED DESCRIPTION OF THE INVENTION

Figures 1, 3:
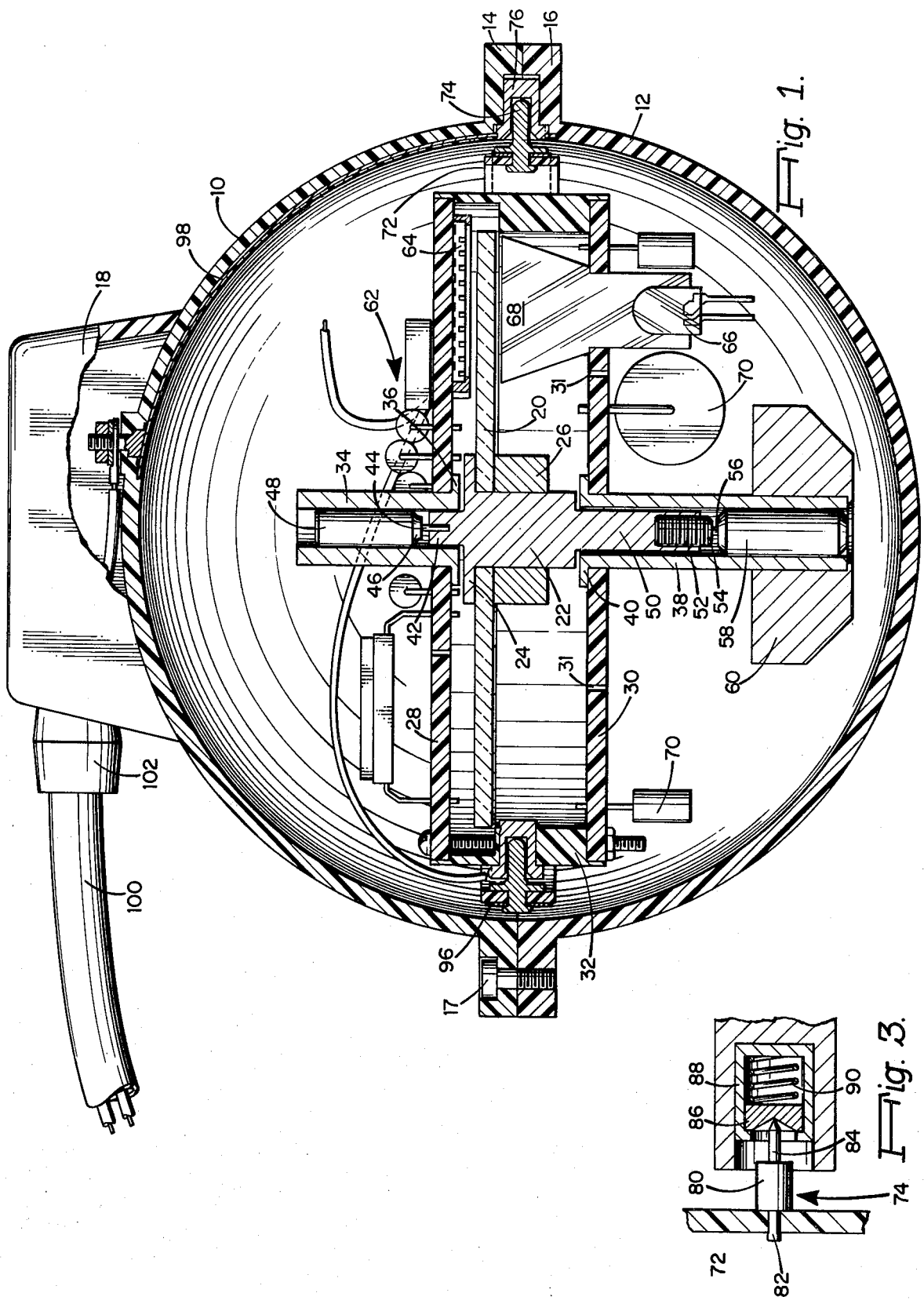
FIG. 1 is a sectional elevation view of a remote reading compass according to the invention.
FIG. 3 is a sectional elevation view of a gimbal pivot assembly useful in the invention.

A remote reading compass constructed and operative according to the invention is shown in FIGS. 1 and 2. A substantially spherical compass housing is composed of an upper hemisphere 10 and a lower hemisphere 12 joined by mating circumferential flanges 14 and 16 which are maintained in intimate fluid sealing relationship by fasteners 17 or other suitable fastening means. The housing portions and associated mounting flanges are typically integrally formed of a suitable non-magnetic material such as Lexan. A terminal box 18 is affixed to housing portion 10 and is employed for electrical coupling from the compass to display or other utilization apparatus.

The compass card is in the form of a transparent disc 20 containing on a surface thereof a plurality of concentric tracks 21 having alternately transparent and opaque segments in predetermined array to provide coded representations of compass headings, as described in the aforesaid copending application and patent. The disc 20 is mounted via a central opening therein to a shat 22 which includes a flange portion 24 against which disc 20 is seated and retained such as by a suitable adhesive. A cylindrical magnet 26 is disposed around shaft 22 and is in engagement with the opposite surface of disc 20 to that confronting flange 24. The disc 20 and magnet 26 are contained within an enclosure formed by circuit boards 28 and 30 which are joined by a circumferential member 32 to define a substantially cylindrical enclosure. A cylindrical collar 34 extends upwardly from circuit board 28 through a central opening therein and is in sealing relationship therewith by means of a flange 36. A second cylindrical collar 38 is affixed by a flange 40 to circuit board 30, also via a central opening therein. The shaft 22 includes an upper portion 42 containing a pivot pin 44 which is cooperative with a bearing cup 46 within cylindrical member 48 contained within collar 34 to form the upper bearing for the compass disc. Shaft 22 includes a lower extension 50 in the lower extremity of which is threaded a set screw 52 which includes a bearing cup 54 cooperative with a pivot pin 56 attached to member 58 which is contained within collar 38. The lower bearing for the compass disc is thus provided by pin 56 and its associated bearing cup 54. Adjustment of the bearings to provide intended low friction pivotal movement of the compass disc 20 is privided by axial adjustment of the bearing assembly within collars 34 and 38. The weight 60 is attached to the lower end of collar 38 to provide a pendulous mass for the compass structure within the cylindrical enclosure. The circuit board 28 includes circuitry 62 mounted thereon and interconnected printed circuit paths formed on one or more surfaces of board 28. The circuitry includes an array 64 of photosensors disposed radially with respect to the coded pattern on disc 20 and operative to provide a plurality of output signals representative of compass headings in accordance with the angular position of disc 20 with respect to array 64. The portion of disc 20 confronting array 64 is illuminated by a light emitting diode 66 in light transmitting arrangement with a lens 68 supported in board 30 and having a rectangular cross-section extending radially of disc 20 in alignment with array 64. This lens 68 is typically formed of a light conductive plastic such as Lucite. The circuit board 30 may also contain electrical components 70 which typically are associated with the circuitry for energizing light emitting diode 66. The circuitry 62 associated with board 28 is usually for the purpose of providing signal processing of the electrical output signals from array 64 for the provision of digital output signals representative of compass heading.

The enclosure containing disc 20 is supported within the outer housing for rotation about two mutually orthogonal axes. A gimbal ring 72 is disposed around the cylindrical wall 32 of the inner enclosure and is pivoted thereto by means of a pair of bearing assemblies 73A and 73B disposed at diametrically opposite positions with respect to ring 72. Each bearing assembly includes a pin 74 affixed to ring 72 and extending radially outward therefrom and in contact with a bearing cup 76 contained within a recess provided in cooperative flanges 14 and 16. The pin 74 and associated bearing cup 76 are of electrically conductive material and are operative to provide efficient electrical connection of the compass to external apparatus.

The bearing assembly is shown in greater detail in FIG. 3. The pivot pin 74 includes a support 80 having a shaft 82 passing through and affixed to ring 72 and an oppositely extending pin 84 terminating in a tapered tip. This pivot pin is typically constructive of Monel having an osmium tip thereon. A bearing cup 86 includes a generally conical recess cooperative with the tip of pin 84, the cup being contained within a support member 88 including a spring 90 therein urging cup 86 into positive electrical contact with pin 84. The cup 86 is typically fabricated of an alloy such as Elgiloy having good bearing properties as well as being conductive.

Disposed along a diameter orthogonal to the diameter at which pivot assemblies 73A and 73B are disposed, are a pair of like bearing assemblies 73C and 73D pivotably coupling ring 72 to the outer housing at its cooperative flanges 14 and 16. A conductive path is provided from pivot assembly 73A to assembly 73D and thence to a first output terminal 92 affixed to the spherical enclosure within terminal box 18. A conductive path is also provided from pivot assembly 73B to assembly 73C and thence to a second output terminal 94 within terminal box 18. As best shown in FIG. 2, the conductive path between assemblies 73A and 73D is provided by a printed or etched path 96 formed on the outer surface of ring 72 and in electrical connection with pin 74 of each bearing assembly. A similar conductive path 97 is provided in interconnection between assemblies 73B and 73C. Respective conductive paths 98 and 99 are provided in etched or printed form on the inner surface of housing portion 10 for electrical connections between assemblies 73C and 73D and the respective terminals 94 and 92. The output terminals are coupled to display or other utilization apparatus by means of an interconnecting two-wire cable 100 having its two wires connected to respective terminals 92 and 94. The cable is typically secured to box 18 by means of a sealing fitting 102 providing a sealed outlet box 18 shielded from moisture or other contamination.

The inner and outer housings are filled with a suitable damping liquid which completely fills the inner housing and which substantially fills the outer housing, leaving a small air space to permit expansion of the damping liquid under elevated temperatures. A plurality of openings 31 can be provided through circuit board 30 and may also be provided through circuit board 20 to provide a fluid communication path by which fluid supplied to the outer housing can enter into the inner housing. Liquid is supplied to the compass enclosure such as by a suitable filling port (not shown).

The compass according to the invention is operative with only two electrical leads for providing all power and signal interconnection with utilization apparatus. The circuitry for providing such two-wire operation is shown in FIG. 4. A battery 110 or other suitable voltage source drives a current source 112 which is connected to leads 114 and 116 of an interconnecting cable. Lead 114 is also connected to an amplifier 118 the output of which provides digital output signals representative of compass heading. The energizing circuit and output amplifier 118 are disposed remote from the compass described above and may be physically associated with an output display or other output apparatus such as an automatic pilot. Within the compass structure described above and typically mounted on circuit board 28 (FIG. 1) is a transistor $Q_1$ having a collector connected to terminal 92 and an emitter connected to terminal 94. The base of transistor $Q_1$ is connected to a signal processor 120 which includes the circuitry for decoding the output signals from array 64 (FIG. 1) into output signal representations of compass heading. The signal processor can be as shown in the aforesaid U.S. Pat. No. 3,833,901 The collector of transistor $Q_1$ is connected via a diode D1 polled as shown to signal processor 120 to which the emitter of transistor $Q_1$ is also coupled. A Zener diode D2 and capacitor C1 are connected in shunt as illustrated. The signal processor 120 is also connected via a resistor R1 and diode D3 to the common line coupled to terminal 94.

The operation of the circuit of FIG. 4 will be described in conjunction with the waveforms of FIG. 5. A substantially constant current is provided by current source 112 to cause charging of capacitor C1 to a predetermined voltage. The Zener diode D2 prevents overcharging of capacitor C1 and also serves to provide regulation of output voltage. The voltage provided by capacitor C1 powers the signal processor 120 which includes a light emitting diode D3 which diode corresponds to item 66 in FIG. 1. The light emitting diode is pulsed in response to an electrical pulse (FIG. 5A) provided by signal processor 120. In response to the light pulse thus provided, the photosensor array 64 of signal processor 120 produces a plurality of parallel digital signals representative of compass heading and which are transformed by the signal processor into a set of serial pulses as shown in FIG. 5B, which pulses are conveyed from signal processor 120 to the base of transistor $Q_1$ via resistor R2.

The transistor $Q_1$ is pulsed into a conducting state upon receipt of each pulse from signal processor 120 causing momentary shortcircuiting of terminals 92 and 94, and the provision at the collector of transistor $Q_1$ of a number of pulses, as shown in FIG. 5D, corresponding to the pulses applied to the base of the transistor. The pulses to the collector of transistor $Q_1$ are the output pulses representing compass heading and which are applied to amplifier 118 for application to an output display or other utilization apparatus. The capacitor C1 becomes partially discharged, as shown in FIG. 5C, in response to the provision of output pulses but remains of sufficient charge to maintain energization of signal processor 120 throughout an operating cycle. After the provision of output pulses representative of compass heading, capacitor C1 again becomes fully charged in response to the constant current source 112 to maintain the signal processor in an energized condition for operation in like manner to produce successive output indications of compass heading.

it is often desirable to employ a balanced output signal format and to this end the invention can be embodied as shown in FIG. 6. A balanced resistor network including series connected resistors R3 and R4 are connected across the terminals 92 and 94 of the circuitry of FIG. 4, with the common connection of these resistors being connected to ground. Lines 114 and 116 connected to terminals 92 and 94 are part of a shielded cable, the shield of which is connected to ground in well known fashion. This output configuration thus provides a balanced output with respect to ground, a typical output voltage from the circuit of FIG. 4 being ± 2.5 volts.

The remote reading compass described above can be efficiently constructed in a small size, typically within a hoursing only 2 inches in diameter, and can be manufactured in a relatively inexpensive manner. The compass is completely isolated from the operating environment and is adapted for installation gimbal otherwise abroad a buoy or vessel for unattended operation. Interconnection of the compass to associated remote apparatus is readily accomplished by the two-wire cable which provides all necessary power as well as signal connections for the compass. By virtue of the electrical connections made to the compass circuitry by means of the gimbal pivots, there need be no flexible wiring within the compass enclosure which would otherwise be needed to permit movement about the gimballed axes and which flexible wiring can hamper intended gimballed motion.

It will be appreciated that various implementations of the invention may occur to those versed in the art without departing from the spirit and true scope of the invention. Accordingly, it is not intended to limit the invention by what has been particularly shown and described except as indicated in the appended claims.

What is claimed is:

1. A remote reading compass comprising:
    a compass disc having a plurality of optically coded tracks providing coded representations of compass headings;
    magnetic means affixed to and rotatable with said compass disc about a normally vertical axis;
    means for mounting said compass disc for rotation about said normally vertical axis;
    photoelectric means for sensing said coded tracks to provide digital signal representations of compass headings;
    electronic circuit means including said photoelectric means and having only first and second terminals by which energizing power is applied to said circuit means and by which digital output signals are coupled from said circuit means representative of compass heading;
    current source means for providing a limited energizing current; and
    means for coupling said current source means to said first and second terminals of said circuit means;
    said electronic circuit means further including means for selectively shunting said first and second terminals to transmit said digital signals.

2. A remote reading compass according to claim 1 wherein said circuit means includes:
    a two-wire interconnecting path coupling said current source means and said circuit means;
    means for storing a predetermined potential in response to current from said source; and
    a signal processor energized by said stored potential and operative in response to digital signal representations derived from said photoelectric means to provide serial output pulses to said two-wire path, said output pulses being representative of sensed compass heading.

3. A remote reading compass according to claim 2 wherein said shunting means further includes:
    a solid state switch operative in response to each of said serial output pulses to momentarily connect a low impedance, relative to the impedance of said current source means, across said two-wire path to provide on said two-wire path pulses corresponding to said serial output pulses.

4. A remote reading compass according to claim 2 further including:
    network means coupled to said two-wire path and operative to provide a balanced output signal configuration.

5. A remote reading compass comprising:
    a compass disc having a plurality of optically coded tracks providing coded representations of compass headings;
    magnetic means affixed to and rotatable with said compass disc about a normally vertical axis;
    means for mounting said compass disc for rotation about said normally vertical axis;
    photoelectric means for sensing said coded tracks to provide digital signal representations of compass headings;
    electronic circuit means including said photoelectric means and having only first and second terminals by which energizing power is applied to said circuit means and by which digital output signals are coupled from said circuit means repesentative of compass heading; and
    a gimbal assembly supporting said compass for rotation about first and second axes which are mutually orthogonal to each other and to said normally vertical axis, said gimbal assembly having pivot bearings providing rotation about said first and second axes; and wherein the first and second terminals of said electronic circuit means are provided by said pivot bearings.

6. A remote reading compass comprising:
    a compass disc having a plurality of optically coded tracks providing coded representations of compass headings;
    magnetic means affixed to and rotatable with said compass disc about a normally vertical axis;
    means for mounting said compass disc for rotation about said normally vertical axis;
    photoelectric means for sensing said coded tracks to provide digital signal representations of compass headings;
    electronic circuit means including said photoelectric means and having only first and second terminals by which energizing power is applied to said circuit means and by which digital output signals are coupled from said circuit means and representative of compass heading; and a gimbal assembly supporting said commpass for rotation about first and second mutually orthogonal axes and having electrically conductive pivot bearings for providing rotation about said mutually orthogonal axes and electrical coupling of said electronic circuitry to said first and second terminals.

7. A remote reading compass comprising:

a outer housing;

an inner housing disposed within said outer housing and including:

a compass disc disposed within said inner housing and supported for rotation about a normally vertical axis, said compass disc having a plurality of optically coded tracks providing coded representations of compass headings;

a magnet affixed to and rotatable with said compass disc;

photoelectric means for sensing said coded tracks to provide digital signal representations of compass heading;

a gimbal assembly supporting said inner housing within said outer housing for rotation about first and second axes which are mutually orthogonal to each other and to said normally vertical axis;

first and second electrically conductive pivot assemblies defining said first mutually orthogonal axis and coupling said inner housing to said gimbal assembly;

third and fourth pivot assemblies defining said second mutually orthogonal axis and coupling said gimbal assembly to said outer housing;

first and second conductive paths connecting respective ones of said first and second pivot assemblies to respective ones of said third and fourth pivot assemblies;

first and second output terminals on said outer housing and in electrical communication with the interior of said outer housing; and third and fourth conductive paths connecting respective ones of said third and fourth pivot assemblies to respective ones of said output terminals.

8. A remote reading compass according to claim 7 wherein said magnet is disposed along said normally vertical axis at a point spaced from said compass disc to provide a pendulous mass.

9. A remote reading compass according to claim 7 wherein said inner and outer housings contain a damping liquid for minimizing spurious motion.

10. A remote reading compass according to claim 9 wherein said inner housing includes:

one or more passages therethrough for providing fluid communication of said damping liquid.

11. A remote reading compass according to claim 7 including:

electronic circuit means disposed within said outer housing and coupled to said photoelectric means for providing digital output signals representing compass heading.

12. A remote reading compass according to claim 11 wherein said inner housing includes a circuit board containing said electronic circuit means and serving as a portion of said inner housing.

13. A remote reding compass according to claim 7 wherein said inner housing includes:

first and second circuit boards each of generally circular configuration and each forming a respective upper and lower wall of said inner housing and a circumferential member affixed to said circuit boards to provide an inner housing of generally cylindrical configuration;

and including electronic circuitry contained on said circuit boards and cooperative with said photoelectrical means to provide digital output signals representing compass heading.

14. A remote reading compass according to claim 13 including:

a shaft to which said compass disc is affixed for rotation about said normally vertical axis;

first and second bearing assemblies coupled to said shaft providing rotational support therefor;

a weight disposed symmetrically with said normally vertical axis at a position below said inner housing and providing a pendulous mass therefor.

15. A remote reading compass according to clain 14 wherein said photoelectric means includes:

a photosensor array supported by one of said circuit boards and operative in association with the optically coded tracks of said disc to sense light transmitting therethrough;

illumination means supported by the other of said circuit boards in a position to transmit light through said disc for receipt by said array.

16. A remote reading compass according to claim 15 wherein said illumination means includes a light emitting diode; and light propagating means coupling light from said light emitting diode to said disc at a position in alignment with said array.

17. A remote reading compass according to clim 7 wherein each electrically conductive pivot assembly includes:

an electrically conductive pin affixed to said gimbal assembly and an electrically conductive bearing cup in pivotal contact with said pin; and means for maintaining a predetermined contact force on said pin and bearing cup to provide intended pivotal action and electrical contact.

18. A remote reading compass according to claim 7 wherein said gimbal assembly includes a gimbal ring disposed between said inner and outer housings and to which said pivot assemblies are coupled for permitting motion of said inner housing along said first and second mutually orthogonal axes.

19. A remote reading compass according to claim 7 further including:

circuit means coupled to said first and second output terminals and energized by current supplied via said terminals and operative to provide to said output terminals electrical pulses representative of compass heading.

* * * * *